Figure 1:
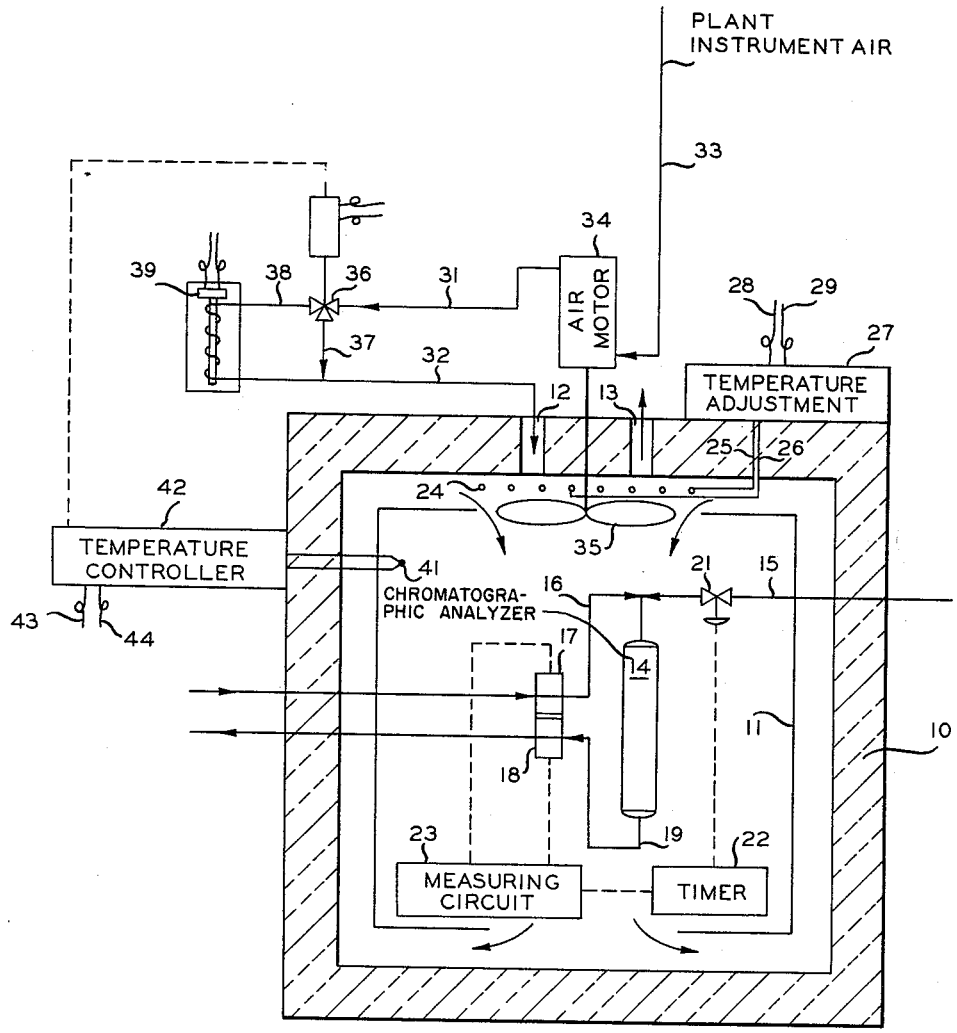

INVENTORS
L. B. ROOF
M. E. REINECKE
BY *Young and Quigg*
ATTORNEYS

_United States Patent Office_ 3,165,147
Patented Jan. 12, 1965

3,165,147
TEMPERATURE CONTROL OF A CONFINED SPACE
Lewis B. Roof and Marvin E. Reinecke, Bartlesville, Okla., assignors to Phillips Petroleum Company, a corporation of Delaware
Filed Dec. 13, 1962, Ser. No. 244,399
9 Claims. (Cl. 165—2)

This invention is directed to a method and means for controlling the temperature of a confined space. In one aspect the invention is directed to the control of temperature in a confined space at a substantially constant level within the ambient temperature range. A more specific aspect of the invention is concerned with a method and means for controlling the temperature within a housing enclosing a chromatographic analyzer system at a substantially constant temperature within the ambient temperature range.

Adsorption chromatography is a known method for analyzing fluid samples by preferential adsorption and desorption. In a conventional system for adsorption chromatography a column containing appropriate adsorber, usually in granular form, is used to separate the various components of a fluid sample. The fluid can be either a gas or a liquid although the analysis is usually conducted on the sample in gaseous form. The gas sample is introduced to the column as a slug of sample gas in a stream of carrier gas passing continuously through the column. Under the conditions of the analysis the various components of the sample are selectively adsorbed and then selectively desorbed by the continuing stream of carrier gas so that the various components of the sample pass out of the column sequentially where their presence and relative concentration can be detected by appropriate sensing means. Various means for sensing the components of a sample according to their characteristic properties include analyzers adapted to detect and record such properties as thermal conductivity, density, refractive index, infrared absorption, and the like.

The desirability of using chromatography for such specific uses as fractionator (multistage distillation) control has been recognized for some time. Certain features of process chromatography, such as specific measurement, high sensitivity, speed of analysis and simplicity of operation, make this type of analyzer very attractive for use in automatic process control. It is of utmost importance that the temperature of the analyzing system be maintained constant particularly when a thermal conductivity cell is employed as the means for sensing the presence and concentration of the components of the sample subject to analysis. One advantage of the thermal conductivity cell as a sensing means for detecting the components of a sample is that it is linearly sensitive to the components to about 100 percent whereas other conventional detectors are linearly sensitive to about 10 percent. This allows the detector to measure the part per million peak and the approximately 100 percent peak in a binary mixture. This assumes, however, that the temperature of the analyzer system and its surrounding atmosphere are maintained substantially constant.

Furthermore, it has been determined that the ease of separation of the components of a mixture, and therefore the accuracy of their detection and measurement, is increased as the operation temperature is decreased. The ease of separation of components in a chromatographic analysis is about doubled for each 20-degree reduction in temperature down to a temperature of about 20° F.

Figure 4:
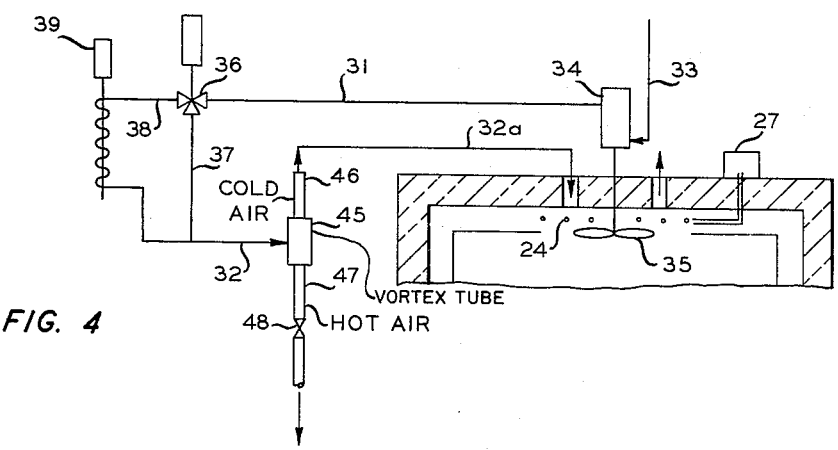
Figure 3:
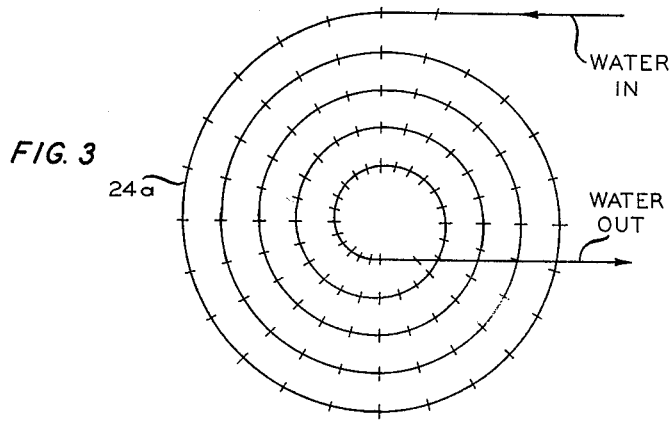
Figure 2:
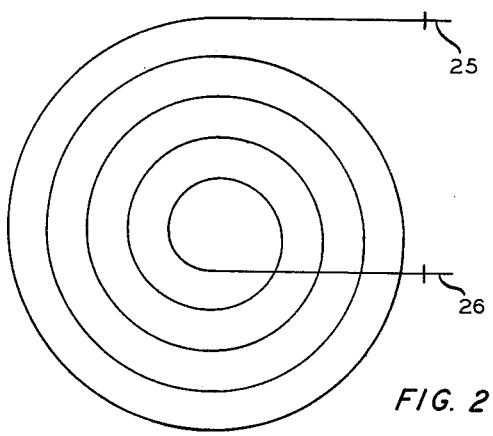

It is an object of this invention to provide a method and means for maintaining the temperature of an enclosed space at a substantially constant level. It is also an object of this invention to provide a method and means for maintaining the atmosphere surrounding a chomatographic analyzer at a substantially constant temperature within the ambient temperature range. The provision of a method and means for maintaining an enclosed space at a substantially constant temperature within the ambient temperature range without resorting to external refrigeration is still another object of this invention. Other objects and advantages of this invention will be apparent to one skilled in the art upon studying this disclosure including the detailed description of the invention and the appended drawing wherein:

FIGURE 1 is a schematic elevation, partly in section, of a preferred embodiment of the invention;
FIGURE 2 is a plan view of an electrical heat exchanger within the insulated housing;
FIGURE 3 is a plan view of a finned conduit heat exchanger as a modification of the heat exchanger of FIGURE 2; and
FIGURE 4 illustrates a modification of the means for cooling the air stream shown in FIGURE 1.

Referring now to the drawing, and to FIGURE 1 in particular, there is shown a housing 10 of thermally insulating material which contains therein a baffle means 11 spaced from the walls of housing 10 and enclosing the interior of housing 10 except for openings at the top and the bottom thereof. The housing 10 contains an air inlet 12 and an air outlet 13 and is otherwise completely closed. Within the housing and baffle there is positioned a conventional chromatographic analyzer apparatus comprising chromatographic column 14 into which is introduced periodically a sample to be analyzed via conduit 15 and is mixed with a carrier gas prior to introduction into the column by means of conduit 16. The column 14 can be filled with a packing material that selectively retards passage therethrough of constituents of a fluid mixture to be analyzed. Sensing elements 17 and 18 can be temperature-sensitive resistance elements known as thermal conductivity cells or other elements adapted to compare a property or properties of fluids flowing through the two sensing elements to provide an indication of a difference or differences between the two fluids. Ordinarily a continuous flow of carrier gas is maintained through the column 14 and samples of definite quantity of the material to be tested are introduced via conduit 15 periodically as the valve 21 is manipulated in response to a signal from the timer 22 which determines the sequence for sample admission. The analysis of the sample is recorded by the measuring circuit 23 or can be transmitted to a point outside the housing 10 for recording, if desired.

A constant amount of heating (or cooling) is added to the housing 10 via heat exchanger 24 (illustrated as a coil of resistance wire) which can be a coil of conduit through which a heating or cooling fluid is circulated or can be a coil of resistance wire electrically heated as shown by means of electrical leads 25 and 26 which are connected to a power source through the temperature adjustment means 27 and electrical leads 28 and 29 connected to a source of electrical energy (not shown).

The temperature of the air within the housing 10 is maintained constant by a flow of air continuously admitted through inlet 12 via conduits 31 and 32. Plant instrument air passes via conduit 33 to air motor 34 which operates circulation means 35 which can be any suitable type of fan. The exhaust air from air motor 34, being cooled as a result of the expansion through the turbine blades of air motor 34, passes via conduit 31 to 3-way valve 36, which can be a solenoid valve, as shown, or any suitable motor valve, and thence through conduit 37 to conduit 32; or, if this air stream requires heating, the air, or a portion of the air, can pass through valve 36 and conduit 38 which is in heat exchange relationship with a heater means 39 which can be a bayonet-type electrical heater, as shown, and thence to conduit 32. A temperature-sensing element indicated by thermistor 41 is positioned within the housing 10 and baffle 11 and transmits a signal representative of temperature to temperature controller 42 which, in turn, is operatively connected to valve 36 so as to direct the flow of air through conduit 37 or conduit 38 as required to maintain the temperature within the housing and baffle at a constant predetermined temperature. Temperature controller 42 is operatively connected by electrical leads 43 and 44 to a source of electrical energy (not shown).

FIGURE 2 is a plan view of the heat exchanger 24 which comprises a coil of electrical resistance wire connected to leads 25 and 26.

FIGURE 3 is a plan view of a coiled tube of finned conduit for circulation therethrough of a heating or cooling fluid which can be substituted for the heating coil heat exchanger 24 and is identified as 24a.

FIGURE 4 illustrates a modification of the means for cooling the air passing via conduits 31, 37 and 32 and comprises a vortex tube 45. The operation of a vortex tube is based on the Ranque-Hilsch effect. The gas passing through the inlet opening enters a tangential entry nozzel producing a vortex in the inner chamber. Energy distribution at this point is such that the heated fraction of the gas passes through the hot exit 47 of the tube 45 while the cooled fraction of the gas, circulated from the center mass of the vortex by a restricted orifice, emerges through the cold exit 46. A valve 48 can be utilized in the hot exit 47 to control the ratio of hot air to cold air produced. A more complete description of the vortex tube is set forth in U.S. Patent 1,952,281, issued March 27, 1934, and which is incorporated herein by reference.

For plant operation, wherein the ambient temperature can vary from less than 0° F. to more than 100° F., the temperature within the insulated housing can be maintained at a constant value as low as 60° F. and as high as the explosive limit of the environment will permit. It will usually be desirable to operate at a temperature of about 60 to 70° F. The system of this invention provides an ambient stabilization factor of about 200:1, i.e., for every 200° F. change in ambient temperature the temperature within the housing will change 1° F.

That which is claimed is:

1. The method of maintaining the interior of an insulated housing at a constant temperature which comprises adding a constant amount of heat to the interior of said housing by means of a heating element; cooling a stream of air; introducing said stream of air to the interior of said housing; recirculating the air in said housing; exhausting air from said housing at the rate it is introduced; continuously sensing the temperature of the interior of said housing; and adding heat to said air stream in an amount sufficient to maintain the sensed temperature of the interior of said housing constant.

2. The method of claim 1 wherein said stream is cooled by expansion through an air motor.

3. The method of claim 2 wherein said stream is further cooled by passing through a vortex tube.

4. Apparatus for maintaining an enclosed space at a substantially constant temperature comprising a thermally insulated first housing; baffle means comprising a second housing positioned within and spaced from said first housing and having an opening in each of two opposite sides; means to add continuously a constant amount of heat to the interior of said housings; means to cool a stream of fluid; a fan positioned in one of the openings in said second housing to pass fluid into said second housing; means to pass the cooled stream of fluid into said first housing at a point adjacent said fan; means adjacent and spaced from the means to pass the cooled stream of fluid into the first housing to remove fluid from said first housing at the the rate of which it is passed into the first housing; a temperature sensing means positioned in said second housing; heating means in heat exchange relationship with the stream of cooled fluid; and control means operatively connected to said temperature sensing means and said heating means so as to add a sufficient amount of heat to said stream of cooled fluid to maintain the temperature of the interior of the housings at a preselected value.

5. Apparatus for maintaining an enclosed space at substantially constant, predetermined temperature comprising a thermally insulated first housing; baffle means comprising a second housing positioned within and spaced from said first housing and having an opening in each of two opposite sides; a fan positioned in one of said openings so as to circulate fluid into said second housing; means to operate said fan; inlet means in said first housing adjacent said fan; outlet means in said first housing adjacent and spaced from said inlet; heat exchange means positioned in said first housing upstream, with respect to fluid flow, from said fan; means to supply a constant amount of heat to said heat exchange means; means to cool a stream of fluid; means to add heat to said stream of fluid; means to pass said stream of fluid to said inlet; a temperature sensing means in said second housing; and a temperature controller means operatively connected to said temperature sensing means and to said means to add heat to said stream so as to add a sufficient amount of heat to said stream to maintain the interior of said second housing at a predetermined temperature.

6. The apparatus of claim 5 wherein the means to operate the fan and the means to cool the stream of fluid is an expansion motor operated by said stream of fluid passed to said inlet.

7. The apparatus of claim 5 wherein the means to cool the stream of fluid includes a vortex tube.

8. The apparatus of claim 5 wherein the heat exchange means is an electrical heater.

9. The apparatus of claim 5 wherein the heat exchange means is a fluid-filled tubular coil.

References Cited in the file of this patent

UNITED STATES PATENTS

| | | |
|---|---|---|
| 1,893,666 | Gebhard | Jan. 10, 1933 |
| 2,510,952 | Brewster | June 13, 1950 |
| 2,583,906 | Van Guilser | Jan. 29, 1952 |
| 2,671,643 | Gordon | Mar. 9, 1954 |
| 2,819,590 | Green | Jan. 14, 1958 |
| 2,912,832 | Clark | Nov. 17, 1959 |
| 3,038,318 | Hanny | June 12, 1962 |
| 3,091,445 | Toney | May 28, 1963 |